United States Patent
Pillilli et al.

(10) Patent No.: US 11,983,260 B2
(45) Date of Patent: *May 14, 2024

(54) PARTITIONED PLATFORM SECURITY MECHANISM

(71) Applicant: Intel Corporation, Santa Clara, CA (US)

(72) Inventors: Bharat Pillilli, El Dorado Hills, CA (US); David W. Palmer, Beaverton, OR (US); Nikola Radovanovic, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,679

(22) Filed: Apr. 6, 2023

(65) Prior Publication Data

US 2023/0244772 A1   Aug. 3, 2023

Related U.S. Application Data

(63) Continuation of application No. 17/355,378, filed on Jun. 23, 2021, now Pat. No. 11,693,940.

(51) Int. Cl.
*G06F 21/33* (2013.01)
*G06F 21/44* (2013.01)
*G06F 21/57* (2013.01)
*G06F 21/73* (2013.01)

(52) U.S. Cl.
CPC ............. *G06F 21/33* (2013.01); *G06F 21/44* (2013.01); *G06F 21/572* (2013.01); *G06F 21/73* (2013.01)

(58) Field of Classification Search
None
See application file for complete search history.

(56) References Cited

U.S. PATENT DOCUMENTS

| 11,409,771 | B1 | 8/2022 | Goyal | |
|---|---|---|---|---|
| 2005/0273602 | A1* | 12/2005 | Wilson | G06F 21/575 |
| | | | | 713/164 |
| 2009/0164739 | A1 | 6/2009 | Harikumar | |

(Continued)

FOREIGN PATENT DOCUMENTS

| TW | 202301166 A | 1/2023 |
|---|---|---|
| WO | 2011000748 A2 | 1/2011 |

(Continued)

OTHER PUBLICATIONS

International Search Report and Written Opinion for PCT/US22/19779 dated Jun. 28, 2022, 9 pages.

(Continued)

*Primary Examiner* — Nelson S. Giddins
(74) *Attorney, Agent, or Firm* — Jaffery Watson Mendonsa & Hamilton LLP

(57) ABSTRACT

A computer platform is disclosed. The computer platform comprises a central processing unit (CPU) including at least one socket having a plurality of tiles and control circuitry to partition the socket into a plurality of sub-sockets and assign a unique identity to each of the plurality of sub-sockets for security verification, wherein each sub-socket comprises at least one of the plurality of tiles to operate as a cluster of resources.

17 Claims, 8 Drawing Sheets

(56) References Cited

U.S. PATENT DOCUMENTS

2015/0106952 A1* 4/2015 Bacher ............... G06F 9/45558
  726/26
2021/0319088 A1 10/2021 Pillilli et al.
2022/0342822 A1 10/2022 Padala

FOREIGN PATENT DOCUMENTS

WO 2020000354 A1 1/2020
WO 2022271220 A1 12/2022

OTHER PUBLICATIONS

Notice of Allowance for U.S. Appl. No. 17/355,378, dated Feb. 17, 2023, 7 pages.

* cited by examiner

PARTITIONED PLATFORM SECURITY MECHANISM

CROSS REFERENCE TO RELATED APPLICATIONS

The present patent application is a continuation application claiming priority from U.S. application Ser. No. 17/355,378, filed Jun. 23, 2021, the contents of which are incorporated herein in their entirety by reference.

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip.

BRIEF DESCRIPTION OF THE DRAWINGS

So that the manner in which the above recited features of the present embodiment can be understood in detail, a more particular description of the embodiment, briefly summarized above, may be had by reference to embodiments, some of which are illustrated in the appended drawings. It is to be noted, however, that the appended drawings illustrate only typical embodiments of this embodiment and are therefore not to be considered limiting of its scope, for the embodiment may admit other equally effective embodiments.

DETAILED DESCRIPTION

In the following description, numerous specific details are set forth to provide a more thorough understanding of the present embodiment. However, it will be apparent to one of skill in the art that the present embodiment may be practiced without one or more of these specific details. In other instances, well-known features have not been described in order to avoid obscuring the present embodiment.

In embodiments, a mechanism is provided to facilitate identification verification of independent virtual clusters operating on a single physical CPU.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to and are not intended to imply that the elements so described must be in a given sequence, either temporally, spatially, in ranking, or in any other manner.

Figure 1:
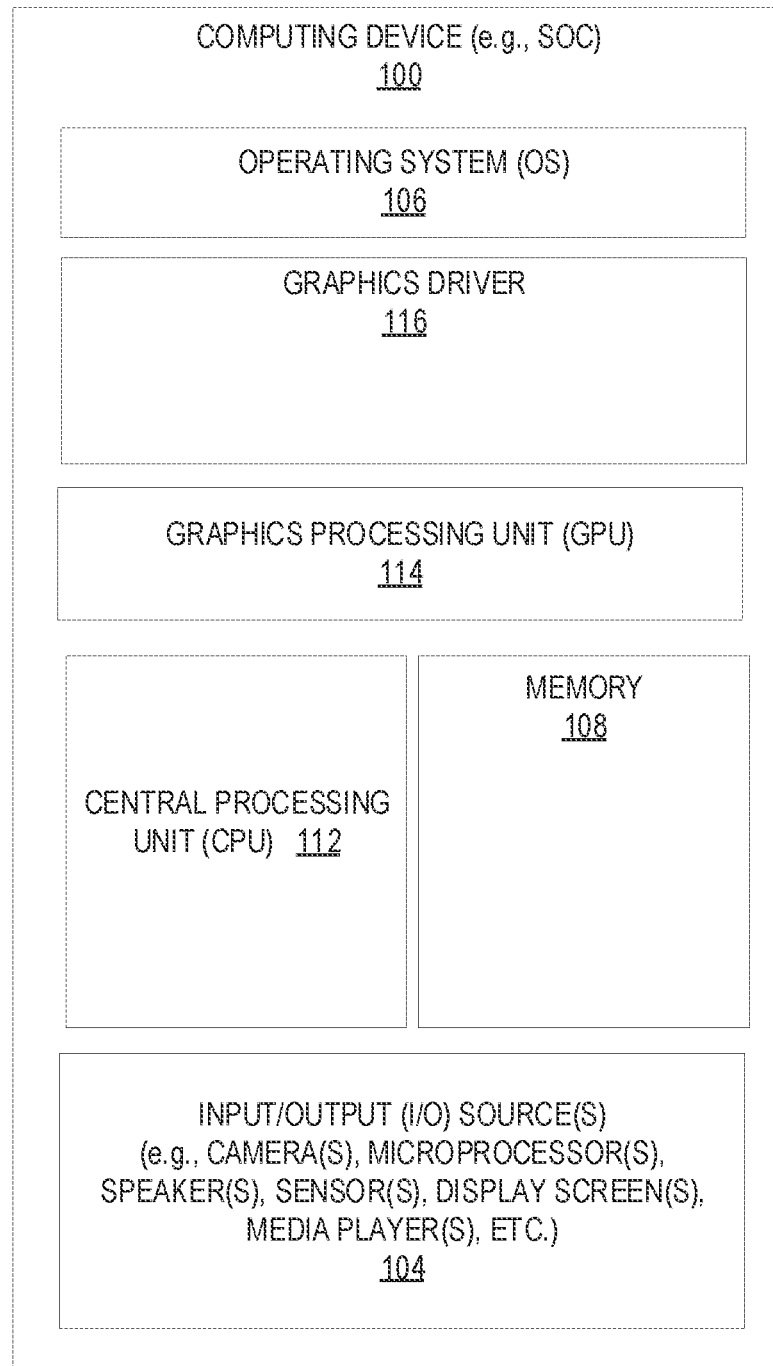
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
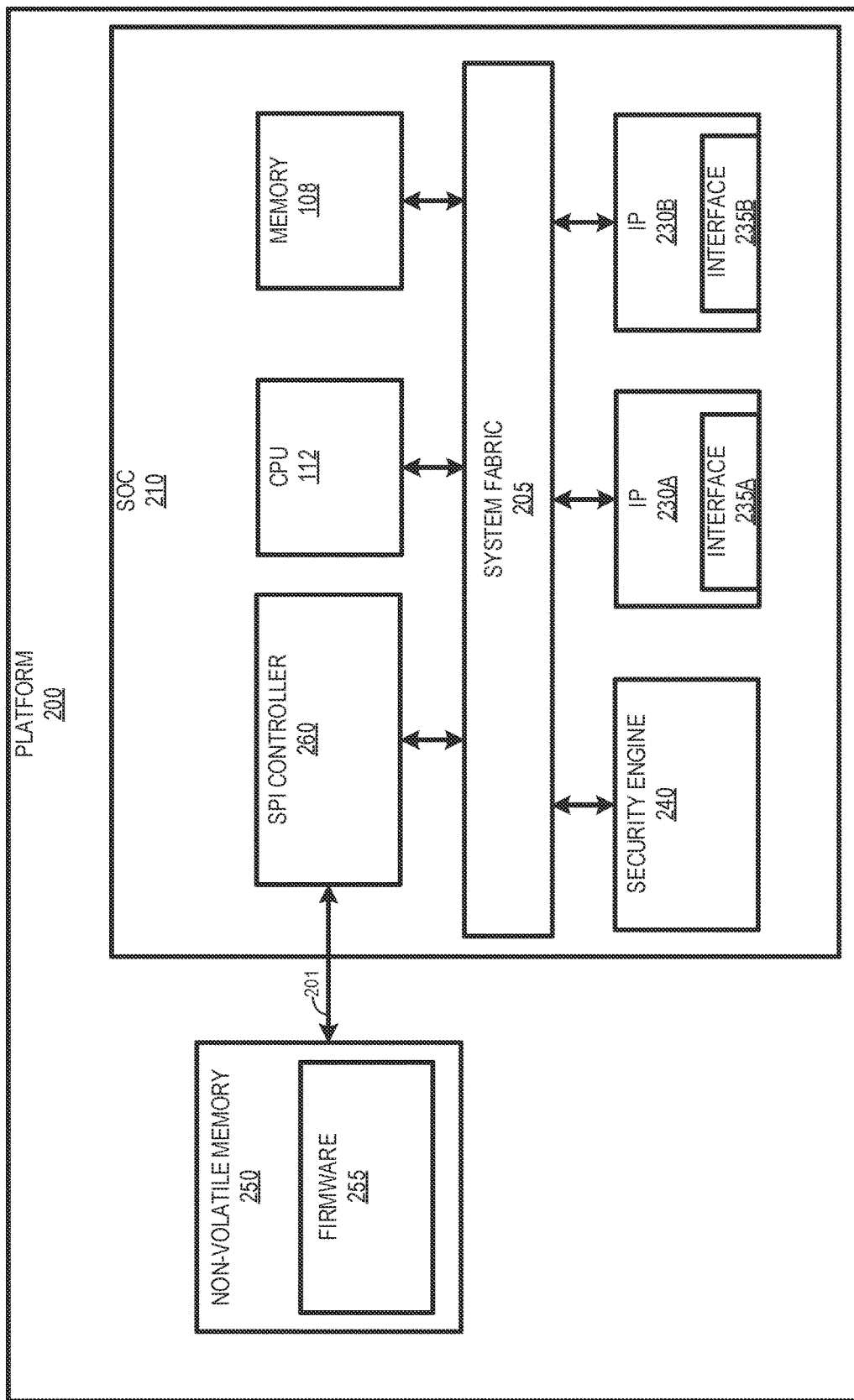
FIG. 2 illustrates one embodiment of a platform.

FIG. 2 illustrates one embodiment of a platform 200 including a SOC 210 similar to computing device 100 discussed above. As shown in FIG. 2, SOC 210 includes other computing device components (e.g., memory 108 and CPU 112) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP agents 230A and 230B) within SOC 210. In such an embodiment, the interconnect protocol provides a standardized interface to enable third parties to design logic such as IP agents to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 (e.g., 235A and 235B) to provide standardization to enable the IP agent 230 to communicate with SOC 210 components. For example, in an embodiment in which IP agent 230 is a third-party visual processing unit (VPU), interface 235 provides a standardization to enable the VPU to access memory 108 via fabric 205.

Further, SOC 210 is coupled to a non-volatile memory 250. Non-volatile memory 250 may be implemented as a Peripheral Component Interconnect Express (PCIe) storage drive, such as a solid-state drive (SSD) or Non-Volatile Memory Express (NVMe) drives. In one embodiment, non-volatile memory 250 is implemented to store the platform 200 firmware 255. In one embodiment, SOC 210 is coupled to non-volatile memory 250 via a serial peripheral interface (SPI) 201. In such an embodiment, SOC 210 includes SPI controller 260 coupled between SPI 201 and system fabric 205. In a further embodiment, SPI controller 260 is a flash controller implemented to control access to non-volatile memory 250 via SPI 201.

SOC 210 also includes a security engine 240 that performs various security operations (e.g., security processing, cryptographic functions, etc.) for SOC 210. In one embodiment, security engine 240 comprises an IP agent 230 that is implemented to perform the security operations. In one embodiment, security engine 240 operates as a root of trust (or platform ROT) to assure the integrity of hardware and software operating on platform 200.

Figure 3:
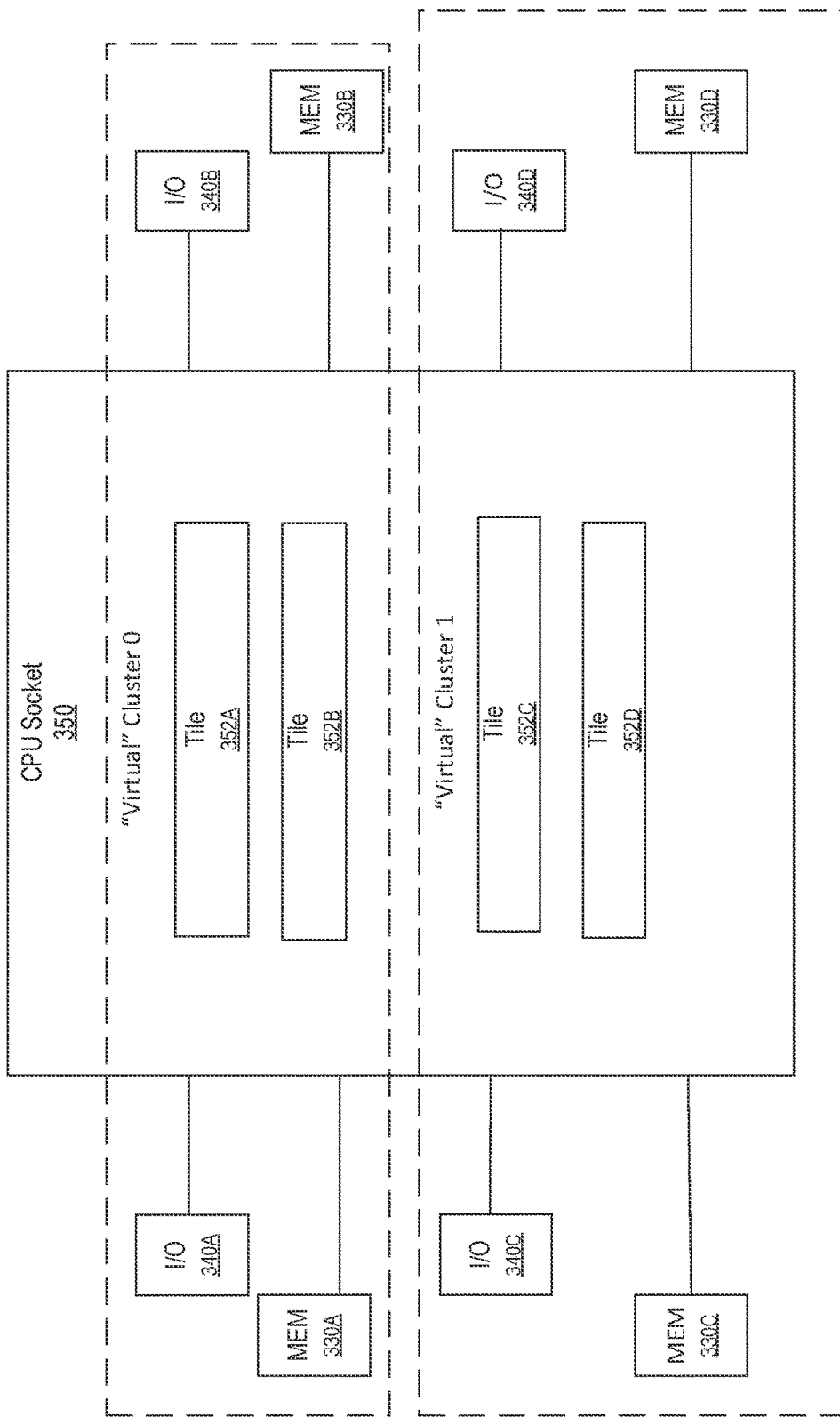
FIG. 3 illustrates one embodiment of a CPU socket.

FIG. 3 illustrates one embodiment of a CPU socket 350. As shown in FIG. 3, CPU socket 350 includes having CPU cores (or tiles) 352, in which tiles 352A and 352B are assigned to a cluster 0 and tiles 352C and 352D are assigned to a cluster 1. In one embodiment, each cluster operates as an independent CPU socket that may execute independent OSs. In such an embodiment, a single CPU 350 may be partitioned such that a single physical CPU and its resources may be partitioned into "independent" sub-sockets based on workload distribution requirements.

Typically, the integrity of a physical socket must be established prior to operation. Thus, a socket must provide its identity and measurements to a platform ROT (e.g., a platform security engine). However, the platform ROT typically requires a device identity to be independently established for each cluster in instances in which a physical socket is partitioned into multiple sub-sockets. The problem is that there is only a single identity associated with the physical CPU.

According to one embodiment, CPU 350 and its chain of trust is provisioned (e.g., by the manufacturer) with a single physical device identity that is used as a "Root" active component root of trust (or AC-ROT Root) by a platform ROT (e.g., security engine 240) to authenticate CPU 350 in order to maintain platform integrity. In a further embodiment, an AC-ROT associated with each sub-socket communicates with the platform ROT when a physical CPU has been dynamically partitioned into multiple sub-sockets.

In such an embodiment, an AC-ROT associated with a sub-socket comprises a "Leaf" AC-ROT (or AC-ROT Leaf) that uses AC-ROT Root as an on-die certificate authority (OD-CA). Thus, a certificate chain derived for each AC-ROT associated with a sub-socket provides a unique identity for each AC-ROT Leaf since the Root is manufacturer certified. As used herein, a certificate authority is an entity that issues digital certificates that certify the ownership of a public key by a named subject of the certificate, which allows others (e.g., relying parties) to rely upon signatures or on assertions made about the private key that corresponds to the certified public key.

Figure 4A:
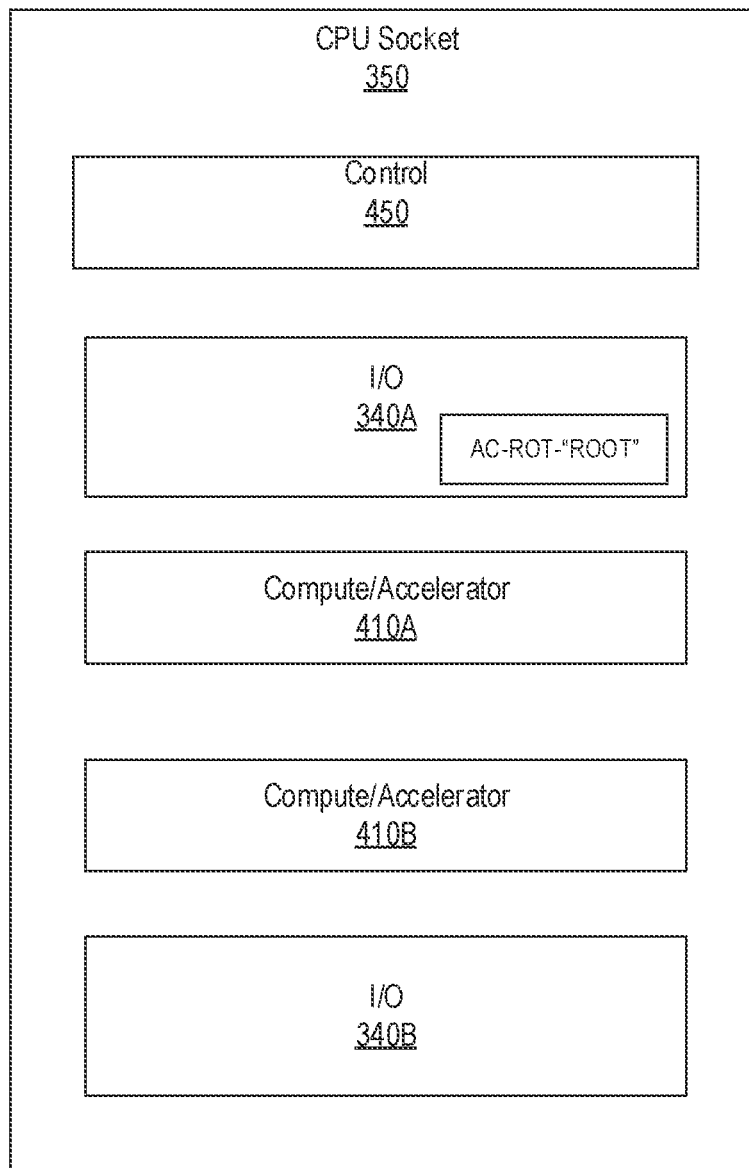
FIGS. 4A and 4B illustrate another embodiment of a CPU socket.
Figure 4B:
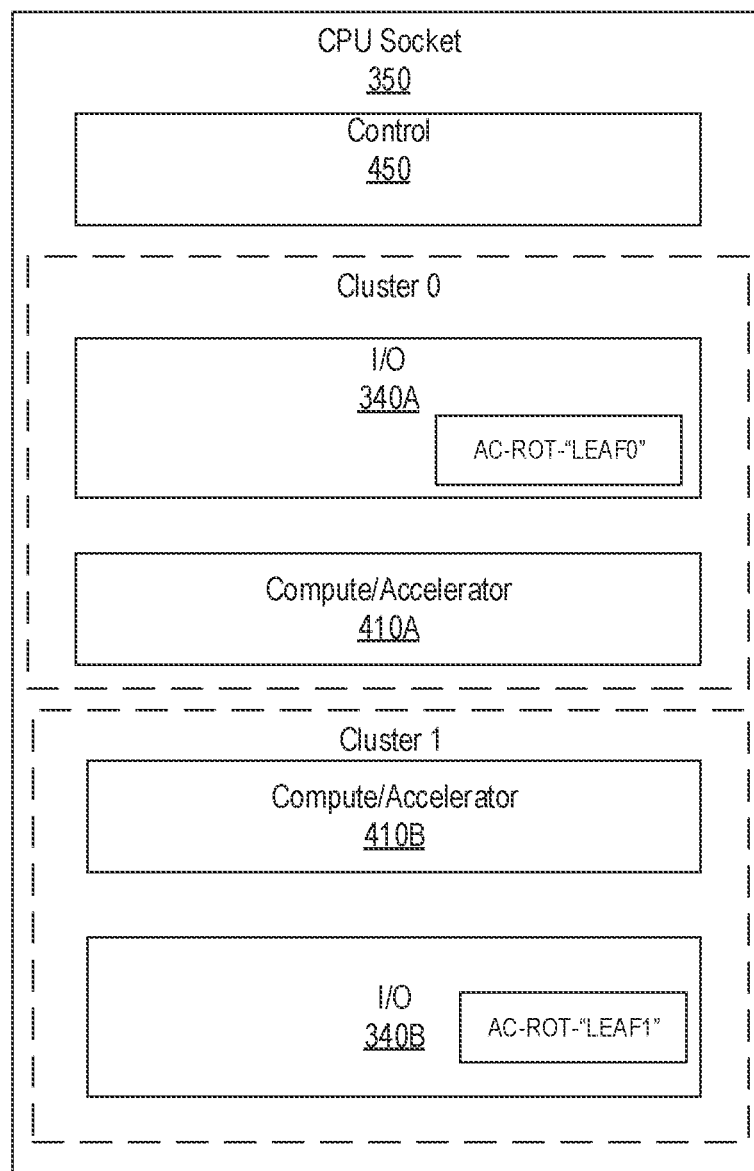

FIGS. 4A and 4B illustrate another embodiment of a CPU 350. FIG. 4A illustrates CPU socket 350 prior to dynamic partitioning, while FIG. 4B illustrates CPU socket 350 after being partitioned into multiple sub-sockets. In one embodiment, each sub-socket is configured as a cluster of resources. As shown in FIG. 4B, a first sub-socket is configured as cluster 0 each that includes I/O 340A and compute/accelerator resources 410A, while a second sub-socket is configured as cluster 1 each that includes I/O 340B and compute/accelerator resources 410B. In a further embodiment, compute/accelerator resources 410 may represent tiles 352 shown in FIG. 3.

CPU 350 also includes control unit 450 that is implemented to direct the operation of CPU 350. According to one embodiment, control unit 450 is implemented is configured to perform the dynamic partitioning of CPU socket 350 into multiple sub-sockets. In a further embodiment, control unit 450 assigns a unique identity to each of the multiple sub-sockets. In such an embodiment, control unit 450 assigns AC-ROT Root to one of the partitioned sub-sockets and generates an AC-ROT Leaf for each of the remaining sub-sockets. As used herein, dynamic partitioning is defined as an automatic combination and division of sub-sockets based on CPU workloads in which multiple sub-partitions may be combined while another sub-socket partition is fully active executing a workload. Although shown as a two sub-socket implementation, other embodiments may implement different quantities of sub-sockets.

FIG. 4B, shows cluster 0 as implementing an AC-ROT Leaf0, while cluster 1 comprises an AC-ROT Leaf1. In one embodiment, a Root is defined as an AC-ROT registered by a manufacturer as an authentic via a certification process, while a Leaf as the AC-ROT that does not have a directly allocated identity. In such an embodiment, control unit 450 uses the AC-ROT Root to generate an AC-ROT Leaf for each of the sub-sockets.

In a further embodiment, AC-ROT Leaf receives a device identifier (or Device ID) public key signed by the AC-ROT Root. As discussed above, AC-ROT Root operates as a certificate of authority. Thus, the resulting certificate chain thereby carries the identity of the manufacturer embedded in the Root AC-ROT. In yet a further embodiment, the platform ROT may independently verify the identify and measurements provided by multiple AC-ROTs as if each were separate physical sockets.

Figure 5:
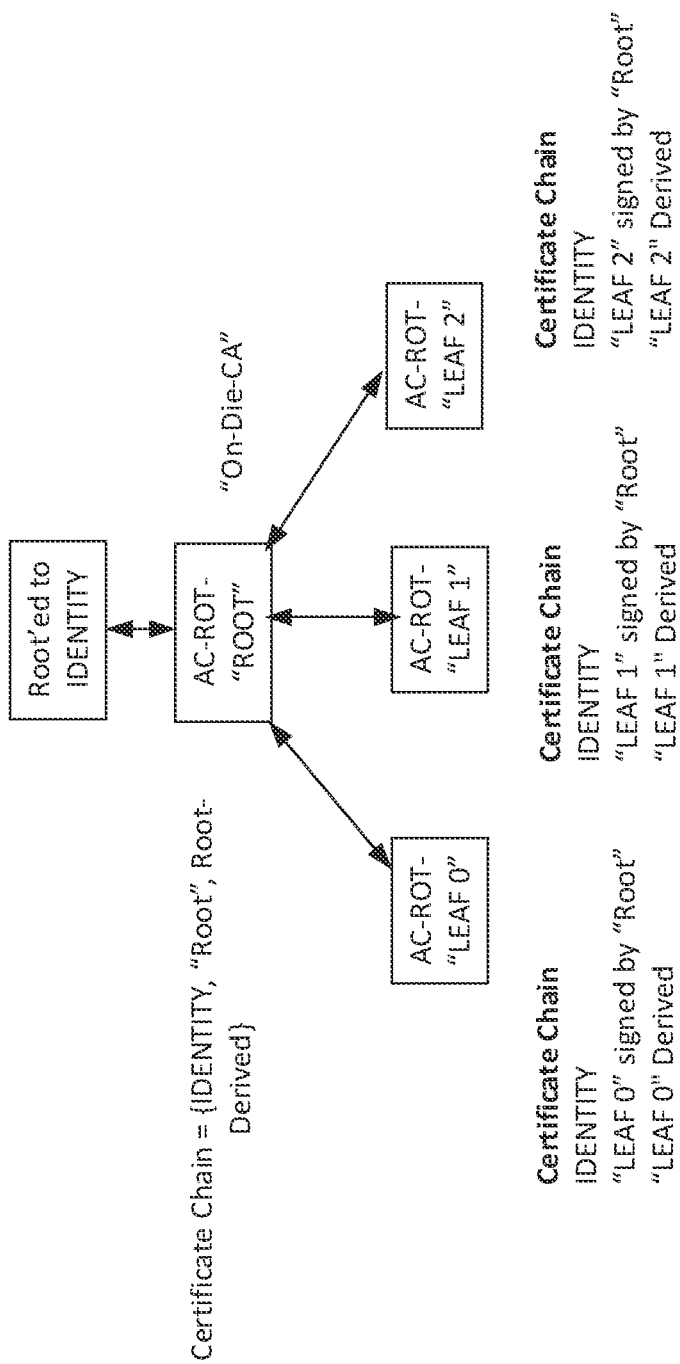
FIG. 5 illustrates one embodiment of a certificate authority.

FIG. 5 illustrates one embodiment of a certificate authority view of an AC-ROT Root. As shown in FIG. 5, AC-ROT Root operates as an on-die certificate authority to generate a certificate chain associated with an AC-ROT Leaf. In one embodiment, the certificate chain associated with an AC-ROT Leaf includes the Leaf identity (e.g., LEAF 1), an indication that the identified leaf has been cryptographically signed by the AC-ROT Root (e.g., LEAF 0 signed by "Root") and the on-device device signature authority associated with the CPU manufacturer (e.g., IDENTITY).

Figure 6:
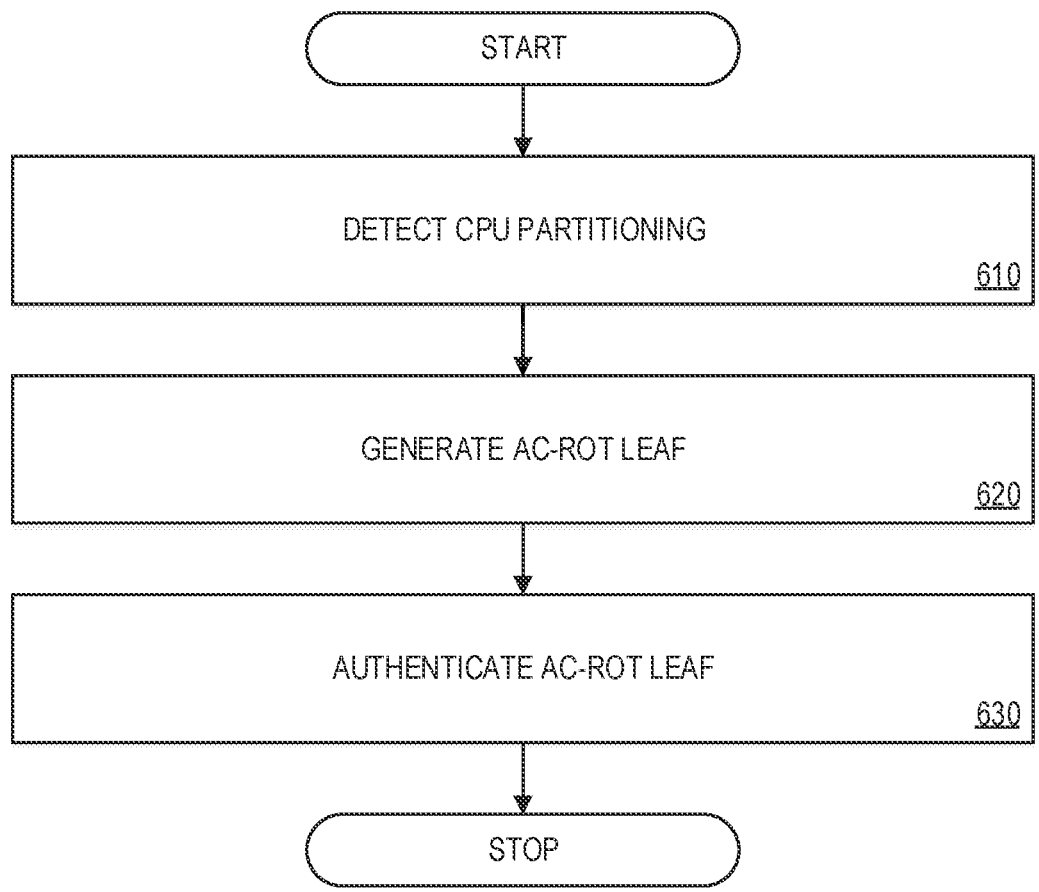
FIG. 6 is a flow diagram illustrating one embodiment of a process for establishing a partitioned root of trust.

FIG. 6 is a flow diagram illustrating one embodiment of a process for establishing a root of trust for sub-sockets of a partitioned CPU socket. At processing block 610, partitioning of the CPU socket is detected. As discussed above, the CPU socket may be dynamically partitioned into multiple sub-sockets based on CPU workloads. As mentioned above, each sub-socket operates as its own virtual cluster of resources that is used to execute separate workloads. At processing block 620, an AC-ROT Leaf is generated for each of the multiple sub-sockets for security verification. As discussed above, an AC-ROT Leaf is generated from a certificate chain using AC-ROT Root as a certificate authority. At processing block 630, each AC-ROT Leaf communicates with the platform ROT (e.g., security engine 240) for identity verification. As discussed above, the platform ROT independently verifies the identify and measurements provided by the AC-ROT Leafs as if each were separate physical sockets.

Figure 7:
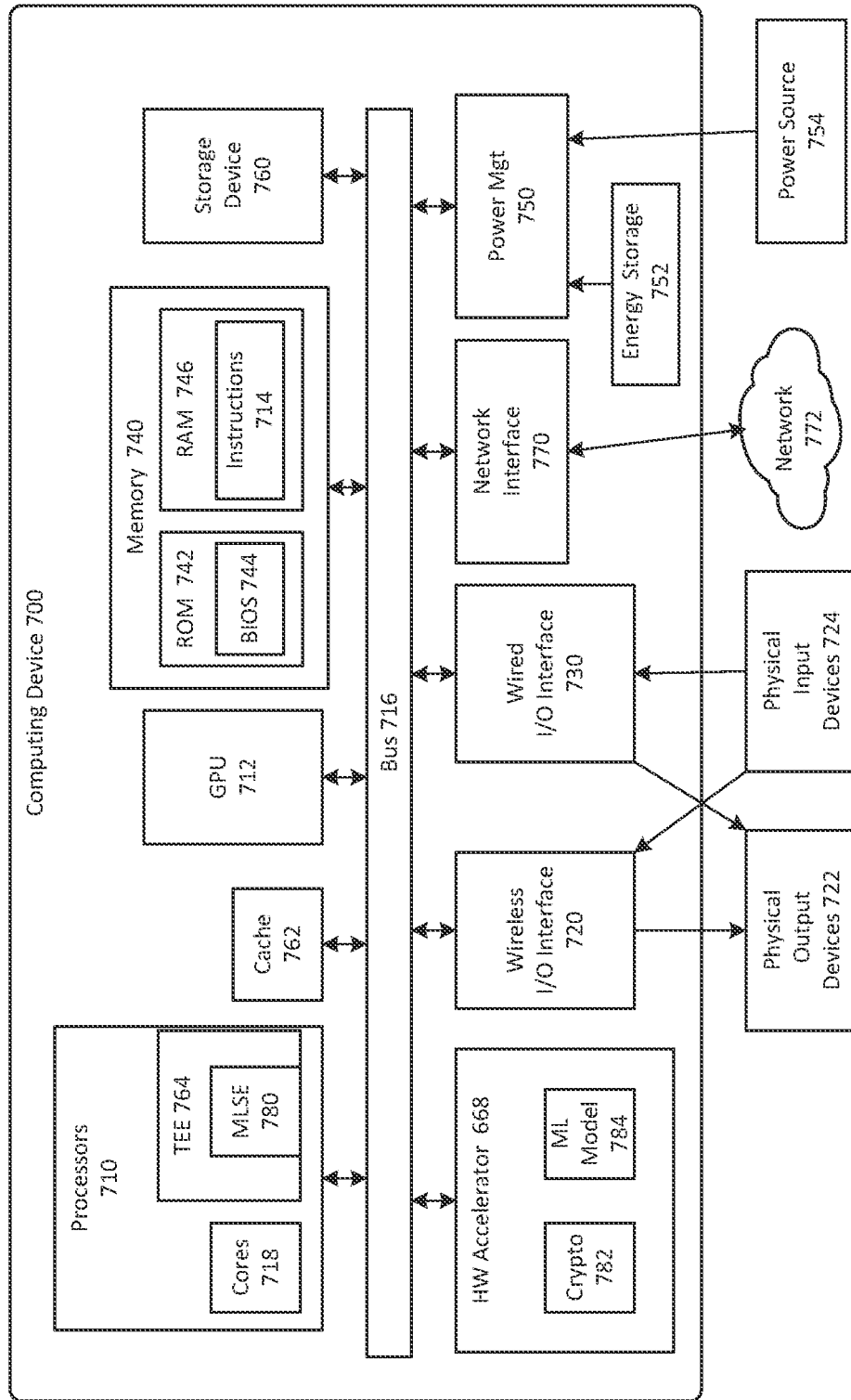
FIG. 7 illustrates one embodiment of a schematic diagram of an illustrative electronic computing device.

FIG. 7 is a schematic diagram of an illustrative electronic computing device to enable enhanced protection against adversarial attacks according to some embodiments. In some embodiments, the computing device 700 includes one or more processors 710 including one or more processors cores 718 and a TEE 764, the TEE including a machine learning service enclave (MLSE) 780. In some embodiments, the computing device 700 includes a hardware accelerator 768, the hardware accelerator including a cryptographic engine 782 and a machine learning model 784. In some embodiments, the computing device is to provide enhanced protections against ML adversarial attacks, as provided in FIGS. 1-6.

The computing device 700 may additionally include one or more of the following: cache 762, a graphical processing unit (GPU) 712 (which may be the hardware accelerator in some implementations), a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random-access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include but are not limited to: universal serial bus (USB), IEEE 1394 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes a computer platform comprising a central processing unit (CPU) including at least one socket having a plurality of tiles and control circuitry to partition the socket into a plurality of sub-sockets and assign a unique identity to each of the plurality of sub-sockets for security verification, wherein each sub-socket comprises at least one of the plurality of tiles to operate as a cluster of resources.

Example 2 includes the subject matter of Example 1, wherein assigning the unique identity to each of the plurality of sub-sockets comprises generating a first active component root of trust (AC-ROT) Leaf associated with a first of the plurality of sub-sockets and generating a second active component AC-ROT Leaf associated with a second of the plurality of sub-sockets.

Example 3 includes the subject matter of Examples 1 and 2, wherein the first AC-ROT Leaf and the second AC-ROT Leaf are generated using an AC-ROT Root.

Example 4 includes the subject matter of Examples 1-3, wherein the AC-ROT Root comprises the CPU AC-ROT.

Example 5 includes the subject matter of Examples 1-4, wherein the AC-ROT Root operates as a certificate of authority to generate a first certificate chain associated with the first AC-ROT Leaf and a second certificate chain associated with the second AC-ROT Leaf.

Example 6 includes the subject matter of Examples 1-5, wherein the certificate chain comprises a leaf identity, an indication that the identified leaf has been cryptographically signed by the AC-ROT Root and an on-device device signature authority associated with a manufacturer of the CPU.

Example 7 includes the subject matter of Examples 1-6, wherein the AC-ROT Leaf receives a device identifier public key signed by the AC-ROT Root.

Example 8 includes the subject matter of Examples 1-7, wherein the platform further comprises a security engine to operate is a root of trust for the platform.

Example 9 includes the subject matter of Examples 1-8, wherein the security engine verifies the identity of the first sub-socket via the first AC-ROT Leaf and verifies the identity of the second sub-socket via the second AC-ROT Leaf.

Some embodiments pertain to Example 10 that includes a method comprising detecting a partitioning of a central processing unit (CPU) socket having a plurality of tiles into plurality of plurality of sub-sockets and assigning a unique identity to each of the plurality of sub-sockets for security verification, wherein each sub-socket comprises at least one of the plurality of tiles to operate as a cluster of resources.

Example 11 includes the subject matter of Example 10, wherein assigning the unique identity to each of the plurality of sub-sockets comprises generating a first active component root of trust (AC-ROT) Leaf associated with a first of the plurality of sub-sockets and generating a second active component AC-ROT Leaf associated with a second of the plurality of sub-sockets.

Example 12 includes the subject matter of Examples 10 and 11, wherein the first AC-ROT Leaf and the second AC-ROT Leaf are generated using an AC-ROT Root.

Example 13 includes the subject matter of Examples 10-12, wherein the AC-ROT Root comprises a CPU AC-ROT associated with the CPU.

Example 14 includes the subject matter of Examples 10-13, wherein the AC-ROT Root operates as a certificate of authority to generate a first certificate chain associated with the first AC-ROT Leaf and a second certificate chain associated with the second AC-ROT Leaf.

Example 15 includes the subject matter of Examples 10-14, further comprising verifying the identity of the first sub-socket via the first AC-ROT Leaf at a platform root of trust and verifying the identity of the second sub-socket via the second AC-ROT Leaf at the platform root of trust.

Some embodiments pertain to Example 16 that includes a system on chip (SOC) comprising a central processing unit (CPU) including at least one socket having a plurality of tiles and control circuitry to partition the socket into a plurality of sub-sockets and assign a unique identity to each of the plurality of sub-sockets for security verification, wherein each sub-socket comprises at least one of the plurality of tiles to operate as a cluster of resources and a security engine to verify the identity of the plurality of sub-sockets.

Example 17 includes the subject matter of Example 16, wherein assigning the unique identity to each of the plurality of sub-sockets comprises generating a first active component root of trust (AC-ROT) Leaf associated with a first of the plurality of sub-sockets and generating a second active component AC-ROT Leaf associated with a second of the plurality of sub-sockets.

Example 18 includes the subject matter of Examples 16 and 17, wherein the first AC-ROT Leaf and the second AC-ROT Leaf are generated using an AC-ROT Root.

Example 19 includes the subject matter of Examples 16-18, wherein the AC-ROT Root operates as a certificate of authority to generate a first certificate chain associated with the first AC-ROT Leaf and a second certificate chain associated with the second AC-ROT Leaf.

Example 20 includes the subject matter of Examples 16-19, wherein the security engine verifies the identity of the first sub-socket via the first AC-ROT Leaf and verifies the identity of the second sub-socket via the second AC-ROT Leaf.

The embodiment has been described above with reference to specific embodiments. Persons skilled in the art, however, will understand that various modifications and changes may be made thereto without departing from the broader spirit and scope of the embodiment as set forth in the appended claims. The foregoing description and drawings are, accordingly, to be regarded in an illustrative rather than a restrictive sense.

What is claimed is:

1. A system comprising:
an integrated circuit (IC), including:
a processor; and
control circuitry to generate a first active component root of trust (AC-ROT) Leaf associated with a first virtual component and generate a second active component AC-ROT Leaf associated with a second virtual component.

2. The system of claim 1, wherein the first AC-ROT Leaf and the second AC-ROT Leaf are generated using an AC-ROT Root.

3. The system of claim 2, wherein the AC-ROT Root comprises an AC-ROT associated with the processor.

4. The system of claim 3, wherein the AC-ROT Root operates as a certificate of authority to generate a first certificate chain associated with the first AC-ROT Leaf and a second certificate chain associated with the second AC-ROT Leaf.

5. The system of claim 4, wherein the certificate chain comprises a leaf identity, an indication that an identified Leaf has been cryptographically signed by the AC-ROT Root and an on-device device signature authority associated with a manufacturer of the processor.

6. The system of claim 5, wherein the AC-ROT Leaf receives a device identifier public key signed by the AC-ROT Root.

7. The system of claim 6, wherein the IC further comprises a security engine to operate is a root of trust for the system.

8. The system of claim 7, wherein the security engine verifies the identity of a first sub-socket via the first AC-ROT Leaf and verifies the identity of a second sub-socket via the second AC-ROT Leaf.

9. A method comprising:
generating a first active component root of trust (AC-ROT) Leaf associated with a first virtual component of a processor; and
generating a second active component AC-ROT Leaf associated with a second virtual component of the processor.

10. The method of claim 9, wherein the first AC-ROT Leaf and the second AC-ROT Leaf are generated using an AC-ROT Root.

11. The method of claim 10, wherein the AC-ROT Root comprises a processor AC-ROT associated with the processor.

12. The method of claim 11, wherein the AC-ROT Root operates as a certificate of authority to generate a first certificate chain associated with the first AC-ROT Leaf and a second certificate chain associated with the second AC-ROT Leaf.

13. The method of claim 11, further comprising:
verifying an identity of the first sub-socket via a first AC-ROT Leaf at a platform root of trust; and
verifying an identity of the second sub-socket via a second AC-ROT Leaf at the platform root of trust.

14. At least one computer readable medium having instructions stored thereon, which when executed by one or more processors, cause the processors to:
generate a first active component root of trust (AC-ROT) Leaf associated with a first virtual component of a processor; and generate a second active component AC-ROT Leaf associated with a second virtual component of the processor.

15. The computer readable medium of claim 14, wherein the first AC-ROT Leaf and the second AC-ROT Leaf are generated using an AC-ROT Root associated with the processor.

16. The computer readable medium of claim 15, wherein the AC-ROT Root operates as a certificate of authority to generate a first certificate chain associated with the first AC-ROT Leaf and a second certificate chain associated with the second AC-ROT Leaf.

17. The computer readable medium of claim 16, having instructions stored thereon, which when executed by one or more processors, further cause the one or more processors to:
  verify an identity of the first sub-socket via a first AC-ROT Leaf at a platform root of trust; and
  verify an identity of the second sub-socket via a second AC-ROT Leaf at the platform root of trust.

* * * * *